Jan. 4, 1966 E. O. BLODGETT 3,227,860
TABULATING CARD READER
Filed Oct. 12, 1959 7 Sheets-Sheet 1

INVENTOR.
EDWIN O. BLODGETT
BY
John A. Harvey
ATTORNEY

Jan. 4, 1966   E. O. BLODGETT   3,227,860
TABULATING CARD READER
Filed Oct. 12, 1959   7 Sheets-Sheet 2
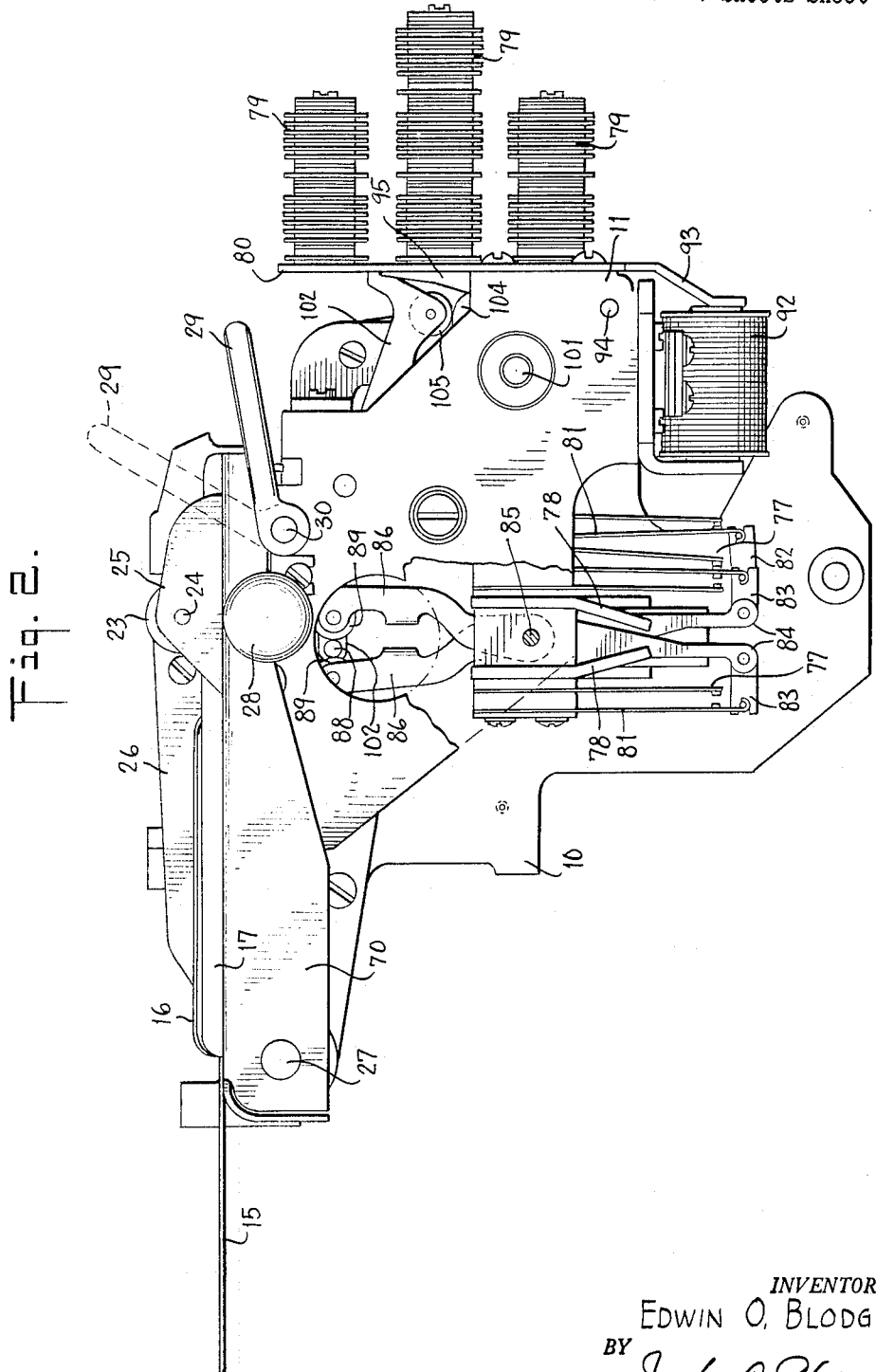
Fig. 2.
INVENTOR.
EDWIN O. BLODGETT
BY
ATTORNEY Jan. 4, 1966 E. O. BLODGETT 3,227,860
TABULATING CARD READER
Filed Oct. 12, 1959 7 Sheets-Sheet 3

INVENTOR.
EDWIN O. BLODGETT
BY
*John A. Harvey*
ATTORNEY

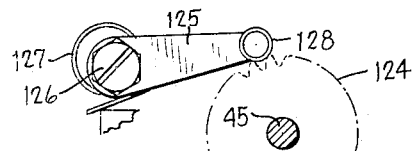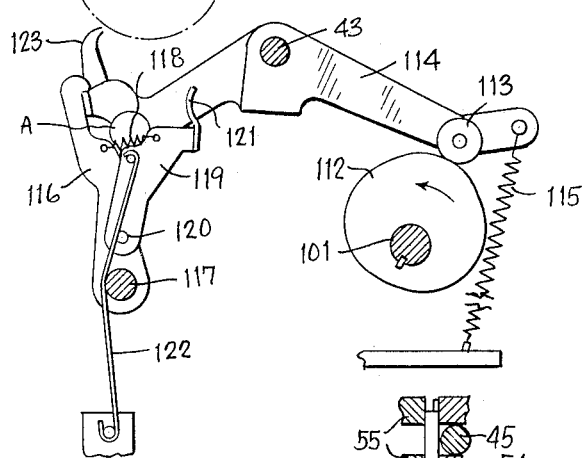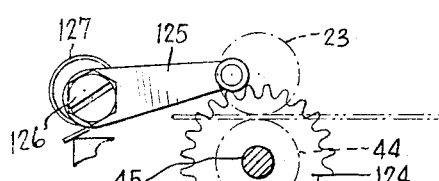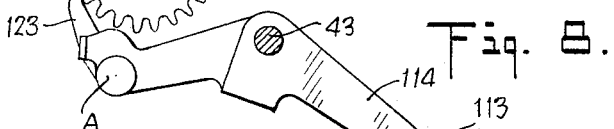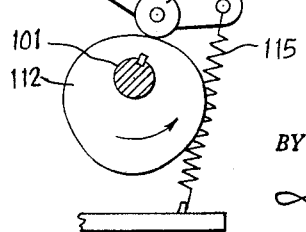

Jan. 4, 1966　　　　　E. O. BLODGETT　　　　3,227,860
TABULATING CARD READER
Filed Oct. 12, 1959　　　　　　　　　　　　7 Sheets-Sheet 5
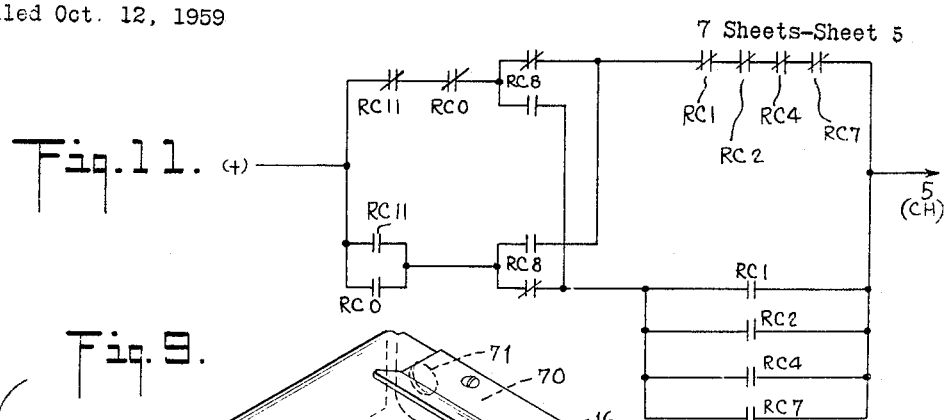
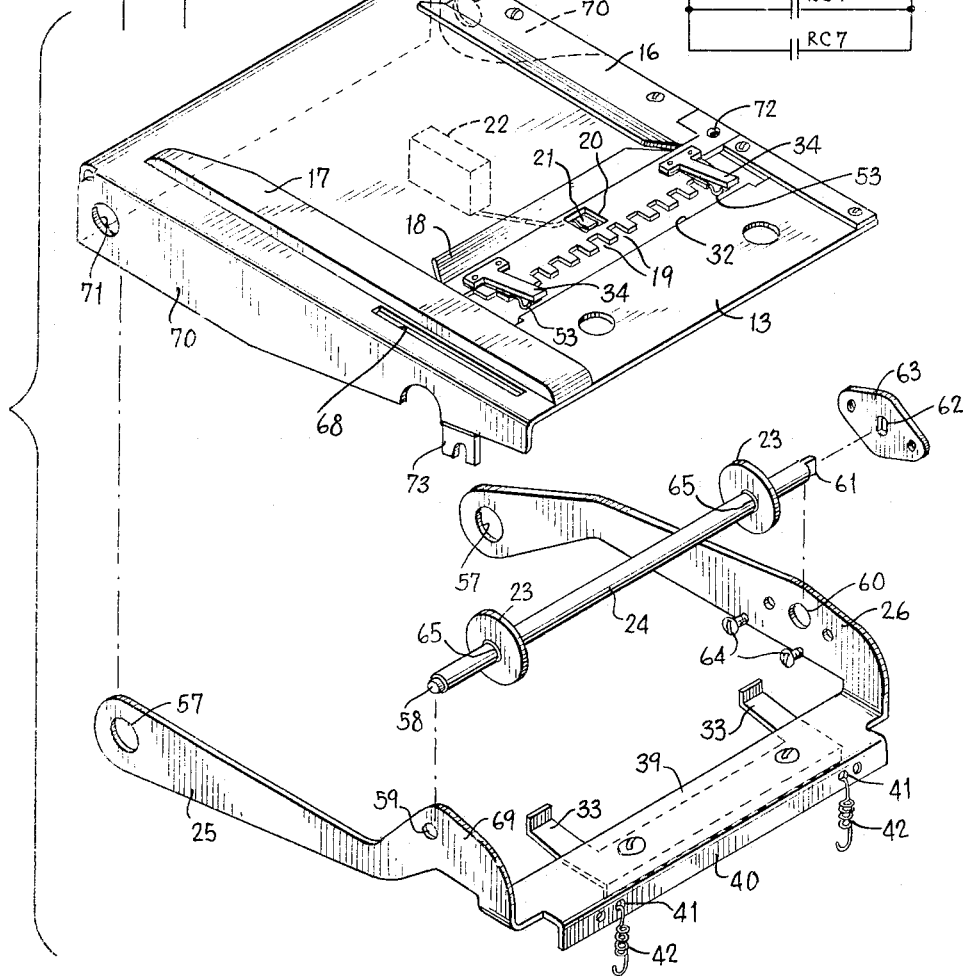
INVENTOR.
EDWIN O. BLODGETT
BY
John A. Harvey
ATTORNEY

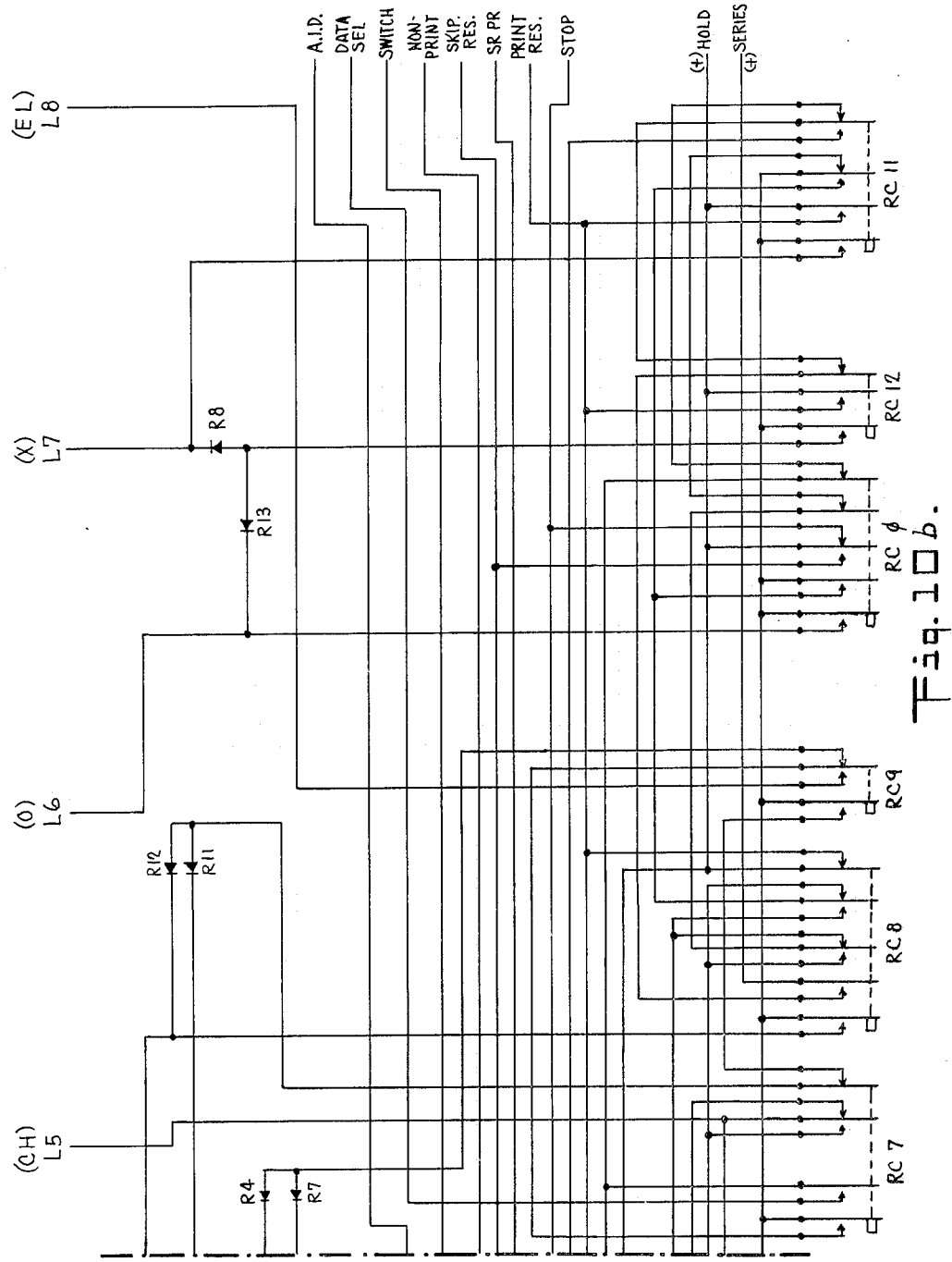

3,227,860
TABULATING CARD READER
Edwin O. Blodgett, Rochester, N.Y., assignor, by mesne assignments, to Friden, Inc., San Leandro, Calif., a corporation of Delaware
Filed Oct. 12, 1959, Ser. No. 845,782
21 Claims. (Cl. 235—61.11)

The present invention relates to tabulating card readers and, particularly, to card readers suitable for reading tabulating cards manually inserted one at a time into reading position in the reader.

Many forms of present day business machines include integral tabulating card readers, but these are usually arranged to read cards which are automatically fed in succession to the reader from a card hopper. Such automatic card feeds are precisely constructed to effect very precise pre-positioning of each card preliminary to its movement, usually at constant velocity into and through the reading station of the machine.

It is often desirable for many applications to read tabulating cards one at a time by manually inserting each card end-wise into a card reader arranged to read successive items of data recorded in successive index-point columns of the card. Often it is desired that the movement of the card through the reader be accomplished in reading steps characterized by step-by-step controlled advance or halt in order that each item of data may be used or skipped as required at any time or even used in intermixed relation with data supplied from another data source. Further, the controlled advance and halt of the card through the reader should enable rapid advance of the card from one index-point column to another yet at each halt should precisely maintain the card accurately positioned for correct index-point column reading from the first to the last of the conventional 80 columns thereof. Sensing means preferably should be provided to prevent reader operations in the absence of a card in the reader or when the card feed means is not properly conditioned for normal feed operations, since these conditions might otherwise give rise to erroneous readings.

Tabulating cards predominantly use a twelve bit code commonly known as the Hollerith code. If this code is to be converted to another code form prior to use of the data read from the tabulating card, many applications demand that the conversion to the new code form should automatically establish and maintain a preselected type of odd or even parity to enable a continuing check of all newly coded data for parity error.

It is an object of the present invention to provide a new and improved tabulating card reader having the desirable attributes enumerated above.

It is a further obect of the invention to provide a novel tabulating card reader wherein tabulating cards may be readily and quickly manually inserted into precise reading position by a relatively unskilled operator.

It is an additional object of the invention to provide an improved tabulating card reader in which step-by-step advance of the card through the reader during reading operations thereof is exceptionally rapid to minimize the time required for the advance yet is one in which the card feed mechanism maintains the same high precision of card positioning for reading each of the numerous index-point columns thereof.

It is yet a further object of the invention to provide a novel tabulating card reader wherein highly consistent accuracy of code reading is enhanced by use of reader-actuated code-contact assemblies which read and temporarily store each code-bit group of the card for such interval as may be desired from time to time to read and utilize the recorded card data, and one wherein actuation of the contact assemblies individually and in Hollerith code combinations enables a highly accurate, consistent, and operationally stable form of static code conversion to be easily and readily accomplished while maintaining during such conversion a preselected type of parity.

Other objects and advantages of the invention will appear as the detailed description thereof proceeds in the light of the drawings forming a part of this application and in which:

FIGS. 1 and 2 illustrate respective top and side elevational views of the construction of a tabulating card reader embodying the present invention;

FIGS. 4-9 are fragmentary views showing specific details of the reader structure and certain phases of its operation;

Figure 10A:
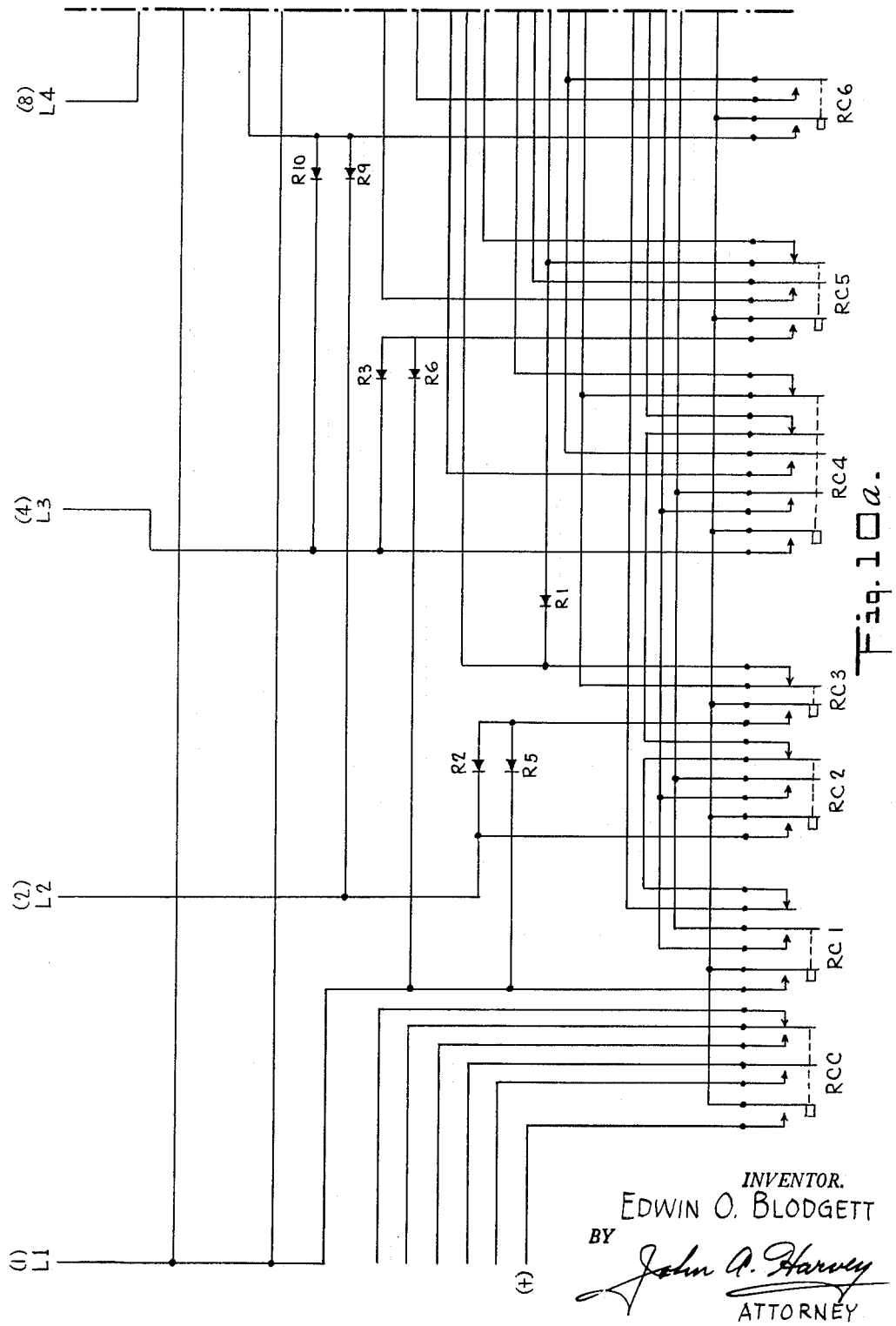

FIGS. 10a and 10b arranged as in FIG. 10 show the electrical arrangement of the Hollerith-to-binary code converter employed in the present card reader; and FIG. 11 shows schematically the arrangement of normally open and normally closed contacts employed in the contact assemblies of the card reader by which to maintain odd parity of the converted binary code.

Figure 1:
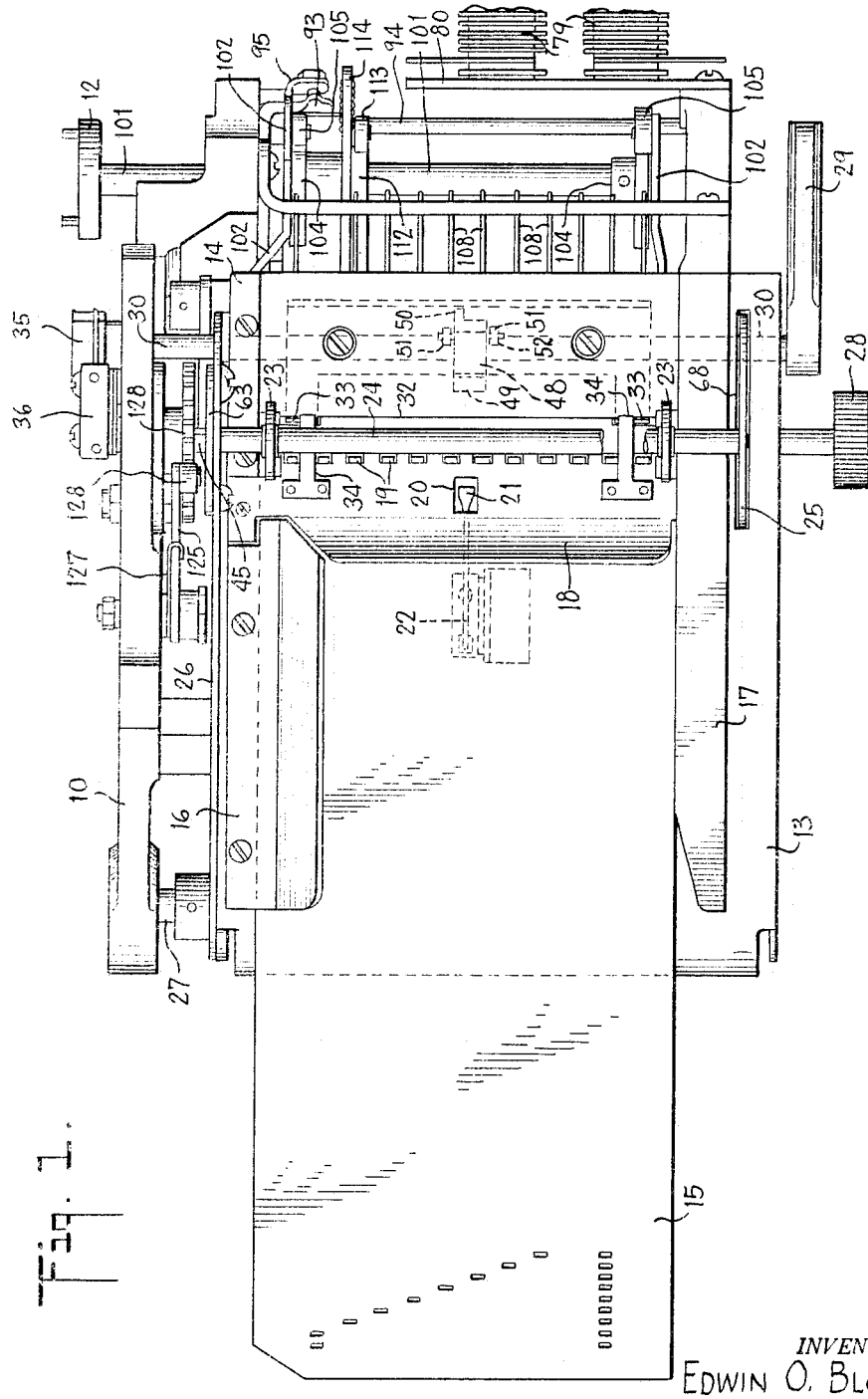

Referring now more particularly to the top view of the tabulating card reader shown in FIG. 1 and the side elevational view shown in FIG. 2, the reader is constructed as a unitary assembly having a back casting 10 and a front casting 11 assembled in unitary spaced relation. The reader is normally mounted by means of the back casting 10 upon the side of a printing machine in the manner of that shown for the tape reader employed in the Blodgett et al. Patent No. 2,905,298, which the present reader would then replace, or to form a component of a motorized reader structure as in the co-pending application of Edwin O. Blodgett, Serial No. 546,902, now Patent No. 2,770,729, entitled Code Form Converter, and assigned to the same assignee as the present application. The present reader is power driven through a flexible coupling 12 from the printing machine or motorized unit with which it forms a component.

The reader includes a fixed platform 13 supported on the castings 10 and 11. Affixed along one edge of the platform 13, as shown is a card edge guide member 14 which has a thickness just slightly greater than that of a tabulating card 15 to be read and thus constitutes a shim upon which a card holddown plate 16 is affixed. A second opposing edge guide 17 for the tabulating card is provided on the platform 13 opposite the guide member 14. A transverse holddown plate 18 is secured to the guide members 14 and 17 in spaced relation to the platform 13 to maintain the tabulating card 15 in engagement with the surface of the platform 13 at the location of card reading pins which are positioned below and reciprocate in aligned relation to the apertures 19 of the holddown plate 18. Both the platform 13 and holddown plate 18 are provided with aligned apertures 20 through which projects the arcuate end of a card sensing arm 21 pivoted upon and actuating an electrical switch 22 of the micro-switch type. This switch is accordingly actuated to a first switch-contact position when the arm 21 is moved downward by the presence of a tabulating card in the reader and to a second switch-contact position when the arm 21 is permitted to move upward in the absence of a card in the reader or when the end of a tabulating card passes the arm 21, and may be used in an electrical control system to permit reader operation when a card is in the reader or terminate its operation in the absence of a card or when its last index-point column has been read.

As will presently be described in more detail, a tabulating card is advanced through the reader in steps corresponding to the index-point column spacing of the card. The advance mechanism includes opposing feed rolls and idler rolls of which the idler rolls 23 shown in FIG. 1 are supported upon a shaft 24 journalled in opposing side arms 25 and 26 of a U-shaped yoke pivoted at the ends of the arms 25 and 26 on a shaft 27 extending between the back casting 10 and front casting 11. The feed roll shaft 45 has a manually actuatable knob 28 on its outer end by which a card may be manually fed forwardly or backwardly through the reader. In a manner presently to be explained, the idler rollers 23 are moved to spaced relation with respect to the feed rolls during manual insertion of a tabulating card into reading position in the reader, this spacing of the rolls being accomplished by angularly moving the yoke 25, 26 about the shaft 27 by manual actuation of a lever 29. This lever is mounted on a shaft 30 journalled in the front and back castings 10 and 11, and is moved from its card reading position shown in full lines in FIG. 2 to its card loading position shown in broken lines in FIG. 2. The yoke 25, 26 in being moved by the arm 29 to separate the idler rolls and feed rolls also effects the insertion through an aperture 32 of the platform 13, and into the path of the card movement on the surface of the platform 13, stop members 33. These are positioned near each edge of the card, and engage at their ends leaf springs which are secured by backup plates 34 to the holddown plate 18 and serve to prevent the leading edge of the card when manually inserted from being forced over the top ends of the stop members 33. The stop members 33 in engaging the leading edge of the tabulating card during its manual insertion into the reader ensure that the card shall be accurately positioned with its first index-point column over the reading pins of the reader.

Manual movement of the handle 29 from the reading position shown in full lines in FIG. 2 to the card loading position shown in broken lines in FIG. 2 actuates a cam 35 secured on the opposite end of the shaft 30, and the cam 35 in turn actuates a micro-switch 36 which may be used in an electrical control system by which to halt the operation of the reader while the lever 29 is positioned in its card loading position.

The structure actuated by the arm 29, and by which the feed rolls are separated and the stop members 33 are inserted into engaging relation with the leading edge of a tabulating card manually placed into the reader, is shown more clearly in FIGS. 3, 4, 5 and 9. As particularly shown in FIG. 9, the yoke arms 25 and 26 are connected by a cross member 39 having an inturned edge 40 with apertures 41 to receive the hooked ends of helical springs 42 anchored at their opposite ends to a shaft 43. The springs 42 bias the yokes 25, 26 and 39 to a position in which the idler rolls 23 engage the tabulating card 15 and, under bias of the springs 42, press it into engagement with feed rolls 44 (FIG. 3) positioned in opposing relation to the idler rolls 23 and secured to a feed roll drive shaft 45.

Affixed to the shaft 30 of the arm 29 is an actuating member 48. The latter has an end 49 which engages one edge of the cross member 39 to limit movement of the arm 29 in its card reading position, and has an opposite end 50 which engages the inturned edge 40 of the cross member 39 to limit movement of the arm 29 in its card loading position. The actuating member 48 supports on opposite sides thereof rollers 51 which rotate freely on a stud shaft 52 carried by the member 48. As shown more clearly in FIG. 4, the stop members 33 are supported on the cross member 39, and the upturned end of the stop members 33 are below the upper surface of the platform 13 in the card reading position of the arm 29 where the rollers 51 are spaced a short distance from the lower surface of the cross member 39 and permit it to be moved under bias of the springs 42 to engage the idler wheels 23 with the tabulating card 15. Manual movement of the arm 29 to the card loading position rotates the actuating member 48 to engage the rollers 51 with the bottom surface of the cross bar 39 and raise the latter against the bias of the springs 42. This separates the idler rolls 23 from the feed rolls 44, and moves the stop members 33 upwardly through the aperture 32 of the platform 13 to a position where the stop members 33 are positioned in the path of movement of the card 15 on the platform 13. This position of the stop members 33 projects their ends into engagement with individual ones of two cooperating leaf springs 53, secured by the backup plates 34 to the hold down plate 18, and moves the leaf springs 53 a short distance so that their ends firmly engage the ends of the stop members 33 and thus prevent the leading edge of a tabulating card when manually inserted into the reader from being forced over the top ends of the stop members 33.

Figure 5:
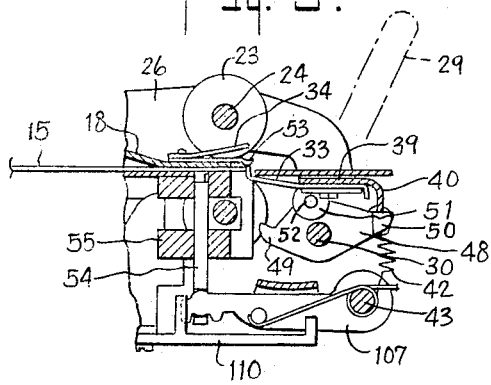

The stud shaft 52 of the actuating member 48 is so located with respect to the shaft 30 that the springs 42 acting through the cross member 39 bias the actuating member 48 in a counterclockwise direction as seen in FIG. 5, thus to maintain the end 50 of the member 48 in firm engagement with the edge 40 of the cross member 39 and thereby bias the lever 29 to its card loading position.

The reader includes aligned reading pins 54 which are guided for reciprocal motion in a guide block 55 secured to the back and front castings 10 and 11. The upturned ends of the stop members 33 are so spaced from the reading pins 54 that upon engagement of the leading end of a newly inserted card with the stop members the first index point column of the card is positioned over the reading pins 54.

The relationship of the card platform 13 with its component assembly and the yoke 25, 26 and 39 with its component assembly is shown more clearly in the exploded view of FIG. 9. The yoke arms 25 and 26 are provided at their ends with apertures 57 by which to pivot the yoke on the shaft 27 as earlier described. A reduced end portion 58 of the shaft 24 is received by an aperture 59 of the yoke arm 25, and the shaft 24 extends through an aperture 60 of the arm 26 and has a milled end portion 61 which is received in an elongated aperture 62 of a plate 63. The latter is secured by machine screws 64 to the arm 26, thus to secure the shaft 24 fixedly in position between the arms 25 and 26 of the yoke. The idler wheels 23 rotate freely upon the shaft 24 and are held in position thereon by C washers 65 received in cooperating circumferential grooves provided on the shaft 24 on opposite sides of each idler roll 23. The platform 13 has an elongated aperture 68 through which the upturned end portion 69 of the yoke arm 25 extends, and has turned down side flanges 70 having apertures 71 by which pivotally to support the platform 13 at its rear end upon the shaft 27. The platform 13 is secured to the rear casting 10 by a machine screw extending through an aperture 72 of the platform 13, and is secured to the front casting 11 by a slotted bracket 73 formed integrally with the platform. The micro switch 22 is supported on a bracket 74 (FIG. 3) spot welded to the lower surface of the platform 13.

Figure 3:
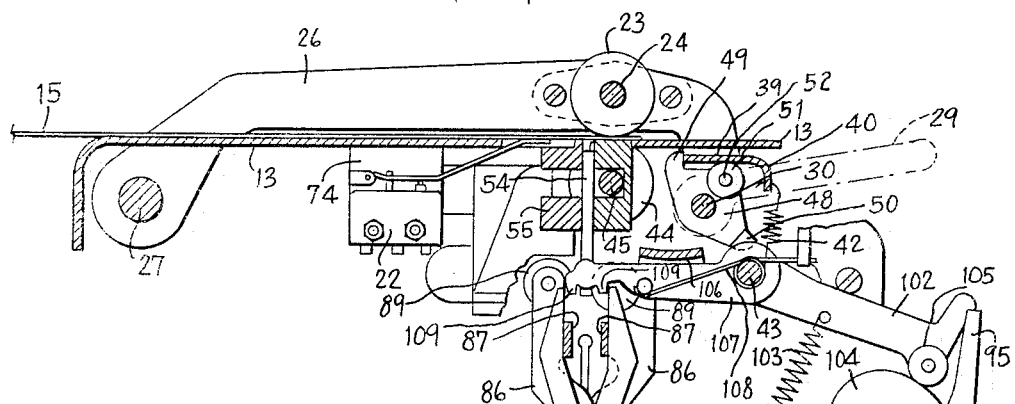
FIG. 3 is an elevational cross-sectional view illustrating certain internal features of construction of the card reader.
Figure 4:
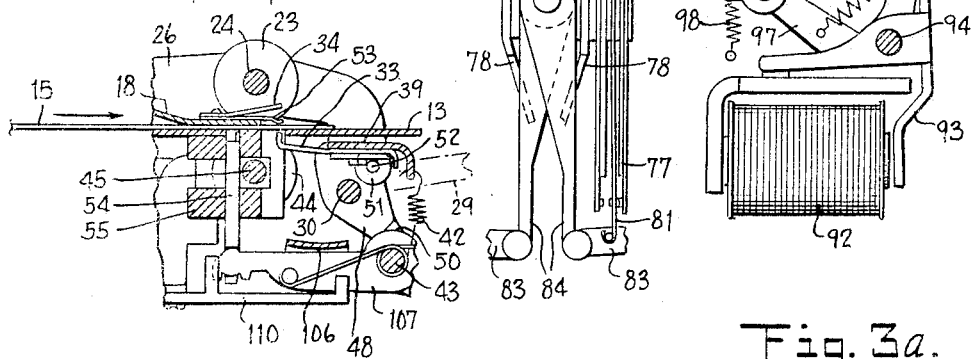
Figure 3A:
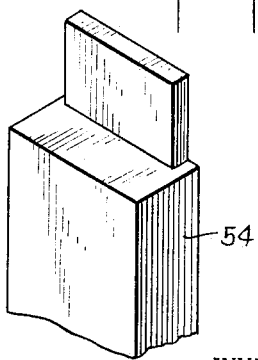
FIG. 3a is an enlarged isometric view of the end portion of a reading pin representative of those used in the card reader.

There are twelve aligned reading pins 54 of rectangular cross-sectional configuration, and each has a reduced cross-sectional end configuration as shown in FIG. 3a for purposes of reading the conventional rectangular punched aperture of tabulating cards. Except for the configurations of the reading pins 54 and the provision of the feed rolls 44 and cooperating idler rolls 23, the reader pin actuating structure and card feed drive structure are the same as those shown in the aforementioned Blodgett et al. Patent No. 2,905,298 to which reference is made for a detailed description of the construction and operation of this portion of the reader. Briefly considered for purposes of the present description, and referring to FIGS. 2 and 3, the reader includes a plurality of opposed rows of contact assemblies 77 which are arranged with six code reading assemblies in each row and a reader common contact assembly in one row. These are supported on guide combs 78 secured between the back and front castings 10 and 11. The number of open circuit, closed circuit, and transfer contacts of the contact assemblies 77 are only generally here indicated, but have a precise composition shown in detail hereinafter in connection with the Hollerith-to-binary code converter of FIG. 10 which, it may be here mentioned, utilizes a plurality of diode rectifiers 79 supported on a plate 80 extending between the back and front castings 10 and 11. Each contact assembly 77 has one or more leaf spring contact members 81 which are interconnected in the individual contact assemblies by link members 82 of insulating material. The innermost contact members 81 of each assembly are connected by similar link members 83 to contact levers 84 pivotally supported on a shaft 85 extending between the back and front castings 10 and 11. There is one contact lever 84 individual to each contact assembly, and the resiliency of the contact members 81 tends to bias the lower and upper ends of the opposed contact levers 84 inwardly toward one another. In the nonreading position of the reading pins 54, however, the opposed ends of the contact levers 84 are moved apart against the resiliency of the contact members 81 by bail structures 86 pivoted on the shaft 85 and having bail members 87 which extend transversely to engage the upper ends of the contact levers 84 and move them apart at the end of each reader cycle operation when an interposer pin 88 is forcibly inserted between rollers 89 supported on the upper ends of the arms of the bail structures 86.

Each reader cycle of operation is initiated by energization of an electromagnet 92 to attract its armature 93. The latter is pivoted on a shaft 94 and in attracted position actuates a latch arm 95 also pivoted on the shaft 94. The latch arm 95 is connected by a spring 96 to an arm 97 formed on the armature 93 and biased by a spring 98 in a direction tending to move the armature 93 to its deenergized position. The arm 97 has a cam follower roller 99 for actuation by a cam 100 affixed to a shaft 101, which is power driven through the flexible coupling 12 (FIG. 1), by which forcibly to move the armature 93 to its deenergized position near the end of the reader cycle. Movement of the latch arm 95 to its unlatch position by energization of the electromagnet 92 permits two bail arms 102 (FIGS. 1 and 3) pivoted on the shaft 43 to move clockwise, as seen in FIG. 3, under bias of a spring 103. The timed movement of the bail arms 102 are controlled by individual cams 104, secured to the shaft 101, and cooperating cam followers 105 rotatably mounted on a stud carried by each arm 102. When the arms 102 move clockwise as seen in FIG. 3, a transverse bail 106 which connects the arms 102 permits a reading pin actuator arm 107 individual to each reading pin 54 and pivoted on the shaft 43 to move upward under bias of a spring 108 individual to each arm 107. The bias of each spring 108 is sufficiently light that a reading pin 54 only lightly engages the under surface of the tabulating card 15 if the latter has no code aperture at the position of the reading pin, but a reading pin which finds a corresponding aperture in the card moves sufficiently far that the end of the reading pin extends through the aperture of the card. This permits the arm 107 of each reading pin which has its end extending through a code aperture of the tabulating card to move sufficiently far that a latch stud 109 on the arm 107 becomes positioned out of latching engagement with the upper end of a corresponding one of the contact levers 84.

Each bail arm 102 carries at its remote end the interposer pin 88 (FIG. 2). The latter is accordingly withdrawn by the foregoing described movement of the arm 102 from between the rollers 89 of the bail structures 86 just after the reading pin arms 107 have been selectively moved as last described. The bails 87 of the bail structures 86 thus move toward one another and this permits those contact levers 87 which are not now latched by a cooperating latch stud 109 of a cooperating reading pin lever 107 to move about its pivot shaft 85 under actuation of the contact spring members 81 and thus actuate a corresponding one of the contact assemblies 77. As the reader progresses through its cycle, the cam 104 and cam follower 105 move the bail arm 102 counterclockwise as seen in FIG. 3. This effects reinsertion of the interposer pin 88 between the rollers 89 of the bail structures 86, so that the bail members 87 force the contact levers 84 apart. Shortly thereafter the bail member 106 engages the upper surfaces of the reading pin actuator arms 107 and withdraws the reading pins 54 from their reading position and repositions the latch studs 109 again in latching relationhip to the contact levers 84.

The card feed drive actuating structure is shown in FIGS. 6, 7 and 8 and includes a cam 112 fixed to the shaft 101 and engaging a cam follower 113 provided on an arm 114 pivoted on the shaft 43. A spring 115 biases the cam follower 113 into engagement with the cam 112 which maintains the arm 114 positioned as shown in FIG. 6 until near the end of the reader cycle. The remote end of the arm 114 has a turned-in end portion which is engaged at this time by a latch member 116 pivoted at 117 on the back casting 10. The latch arm 116 is biased into latching position by a spring 118 connected at one end to the arm 116 and connected at its opposite end to a latch actuating member 119 which is pivoted at 120 on the latch arm 116. The latch actuating member 119 carries a spring member 121 which, as shown in broken lines in FIG. 7, is engaged by one of the bail structures 86 when the bail structures 86 are spaced apart by the interposer pin 88. As the bail structures 86 are permitted to move toward one another when the interposer pin 88 is withdrawn from between the interposer rollers 89 as above described, a bias spring 122 biases the actuating member 119 and latch lever 116 out of latching engagement with the end of the arm 114. This permits the arm 114 to be moved by the spring 115 clockwise, as seen in FIG. 6, and as the cam 112 rotates the arm 114 moves to the position of maximum angular displacement shown in FIG. 8. A ratchet pawl 123 is pivoted on the end of the arm 114 and biased by a spring (not shown) into engagement with the teeth of a ratchet wheel 124 fixed on the shaft 45 which also carries the feed rolls 44. Thus the pawl 123 is moved upwardly, as seen in FIGS. 6 and 8, by movement of the arm 114 and drives the ratchet wheel 124 to rotate the shaft 45 and feed rolls 44 through an angle corresponding to the spacing of the index-point columns of the tabulating card. A detent arm 125, pivoted at 126 on the back casting 10 and biased by a spring 127 to engage a detent roller 128 with the teeth of the ratchet wheel 124, maintains the latter in the position to which it has been moved by the pawl 123 during a card feed cycle of operation. Continued rotation of the cam 112 rotates the arm 114 counterclockwise from its position shown in FIG. 8 to that shown in FIG. 6 and thus positions the pawl 123 for subsequent drive actuation of the ratchet wheel 124. Before return of the arm 114 to the position shown in FIG. 6, the bail structures 86 have been moved apart by the interposer pin 88 (FIG. 2) so that one of the interposer structures 86 again engages the spring 121 of the latch actuating member 119 and through the spring 118 biases the latch arm 116 into latchable engagement with the end of the arm 114 when the latter is ultimately moved by the cam 112 to its full counterclockwise position. This terminates the card feed cycle of operation.

FIGS. 10a and 10b, arranged as in FIG. 10, show the contact composition and electrical interconnections of the code reader contact assemblies 77 (FIGS. 2 and 3).

These contact assemblies are individually identified in FIG. 10 as reader contact assemblies RC1–RC12 corresponding to the twelve code bits or code levels of the Hollerith code. There is also included in the reader structure a reader common contact assembly RCC which, as explained in the aforementioned Blodgett et al. patent, closes or transfers its contacts at each reader cycle for the purpose of energizing the contact assemblies RC1–RC12 and to control other system operations dependent upon the execution of a reader cycle of operation. The reader contact assemblies RC1–RC12 are interconnected with each other and through diodes R1 through R13 as shown to output circuits L1–L8 by which to convert the twelve bit or twelve level Hollerith code to an eight level binary code of which the individual code levels from the first to the eighth are respectively designated in FIG. 10 as L1 through L8. In this, it will be noted that the reader contact assembly RC1 directly energizes the first level code output circuit L1, the reader contact assembly RC2 directly energizes the second level code output circuit L2, the reader contact assembly RC3 through diode rectifiers R2–R5 energizes both the output circuits L1 and L2, the reader contact assembly RC4 directly energizes the third level output circuit L3, the reader contact assembly RC6 through diode rectifiers R9 and R10 energizes the first and third level code output circuits L1 and L3, the reader contact assembly RC7 through rectifiers R4, R7, R9 and R10 energize all of the first three code level output circuits L1–L3, the reader contact assembly RC8 directly energizes the fourth level code output circuit L4, the reader contact assembly RC9 through diode rectifiers R11 and R12 energizes the first and fourth level code output circuits L1 and L4. The reader contact assemblies RC0, RC11 and RC12 read the zone binary bits of the Hollerith cole (conventionally used in combination with one of the numeric bits 1 through 9 to record alphanumeric data and symbols), the reader contact assembly RC0 accordingly energizing the sixth level code output circuit L6, the reader contact assembly RC11 directly energizing the seventh level code output circuit L7, and the reader contact assembly RC12 through diode rectifiers R8 and R13 energizing both the sixth and seventh level code output circuits L6 and L7. The eighth level code output circuit L8 is energized when the reader contact assemblies RC7 and RC9 concurrently transfer. The fifth level code output circuit L5 is one wherein there is generated a redundant parity check bit to maintain odd parity for each combination of energization of the output circuits L1–L8. The manner in which the generation of this redundancy check bit is accomplished will now be explained in detail.

The conventional Hollerith code uses code levels 1 through 9 to represent the corresponding decimal valued numeric digits, and uses these same code levels in combination with the zone code levels 10, 11 and 12 to represent alphabet characters, symbols, and functional control information. FIG. 11 shows the arrangement of normally open and normally closed contacts of certain of the contact assemblies there identified and by which the fifth level output circuit L5 is energized to maintain odd code parity. The code conversion accomplished by the FIG. 10 arrangement is one wherein actuation of the reader contact assemblies RC1, RC2, RC4, RC8, RC0 and RC11 energize individual ones of the output circuits L1–L8 whereas actuation of reader contacts RC3, RC5, RC6, RC9 and RC12 energize combinational pairs of the output circuits L1–L8. Actuation of the reader contact assembly RC7 concurrently energizes three output circuits L1–L3. Inspection of the contact arrangement of FIG. 11 will show that a redundancy check bit is generated in the output circuit L5 when: (a) neither of the zone contact assemblies RC0 or RC11 is actuated and none of the contact assemblies RC1, RC2, RC4, RC7 or RC8 are actuated, so that one or more of the contact assemblies RC3, RC5, RC6, RC9 or RC12 has been actuated to energize one or more pairs of the output circuits L1–L8; (b) when neither the contact assembly RC0 or RC11 is actuated and the contact assembly RC8 is actuated concurrently with actuation of one of the reader contact assemblies RC1, RC2, RC4 or RC7; (c) when one of the zone contact assemblies RC0 or RC11 is actuated concurrently with actuation of one of the contact assemblies RC1, RC2, RC4 or RC7; or (d) when one of the zone contact assemblies RC0 or RC11 is actuated concurrently with actuation of the contact assembly RC8 but without concurrent actuation of one of the contact assemblies RC1, RC2, RC4 and RC7. It will thus be apparent that the redundancy check output circuit L5 is energized whenever one or more pairs of output circuits L1–L8 are energized through diode rectifiers by actuation of the reader contact assemblies RC3, RC5, RC6, RC9 and RC12, or when two contact assemblies are concurrently actuated which when actuated alone would energize single output circuits but together again energize a pair of the output circuits L1–L8. Otherwise the code conversion itself maintains odd parity and the redundancy check bit output circuit L5 is not energized.

Various normally closed, normally open, and transfer contacts of the contact assemblies RC1–RC12 are interconnected as shown in FIG. 10 to energize functional control output circuits whenever an address identification code (AID), a data select code, a switch code, a nonprint code, a skip restore code, a common skip restore and print restore code, a print restore code, or a stop code is read. These several functional control output circuits and those of the reader common contact assembly RCC may be utilized for functional controls of the reader operation such as is shown and described in the co-pending application of E. O. Blodgett et al., Serial No. 845,989, filed October 12, 1959, entitled Data Translation System, and assigned to the same assignee as the present application.

While a specific form of invention has been described for purposes of illustration, it is contemplated that numerous changes may be made without departing from the spirit of the invention.

What is claimed is:

1. A tabulating card reader comprising a fixedly positioned card-supporting platform, at least one rotatably supported feed roll having a peripheral drive surface projecting through an opening in said platform and into driving engagement with the lower surface of a tabulating card supported on said platform, pivotal means for rotatably supporting at least one idler roll in opposing relation to said feed roll and transversely movable into and out of biased engagement with the upper surface of said tabulating card for longitudinal drive movement of said card by idler roll pressure engagement of said card against the peripheral drive surface of said feed roll, means for rotationally driving said feed roll in successive angular steps corresponding to the index-point column spacing of said card, means for reading combinational code apertures in successive index-point columns of said card, and manually actuable means for moving said pivotal means to move said idler roll between card-disengaged and card-engaged positions and for concurrently projecting and withdrawing at least one leading-edge card-stop member to enable manual prepositioning of a card on said platform with the first index-point column of said card accurately positioned in readiness for reading by said reading means.

2. A tabulating card reader comprising a fixedly positioned card-supporting platform, at least one rotatably supported feed roll having a peripheral drive surface projecting through an opening in said platform and into driving engagement with the lower surface of a tabulating card supported on said platform, pivotal means for rotatably supporting at least one idler roll in opposing relation to said feed roll and transversely movable into and out of biased engagement with the upper surface of said tabulating card for longitudinal drive movement of said card by idler roll pressure engagement of said card against the peripheral drive surface of said feed roll, means including detent means for rotationally driving said feed roll in successive angular steps precisely controlled by said detent means and of angular value corresponding to the index-point column spacing of said card, means for reading combinational code apertures in successive index-point columns of said card, and manually actuable means for moving said pivotal means to move said idler roll between card-disengaged and card-engaged positions and for concurrently projecting and withdrawing at least one leading-edge card-stop member to enable manual prepositioning of a card on said platform with the first index-point column of said card accurately positioned in readiness for reading by said reading means.

3. A tabulating card reader comprising a fixedly positioned card-supporting platform, at least one rotatably supported feed roll having a peripheral drive surface projecting through an opening in said platform and into driving engagement with the lower surface of a tabulating card supported on said platform, pivotal means for rotatably supporting at least one idler roll in opposing relation to said feed roll and transversely movable into and out of biased engagement with the upper surface of said tabulating card for longitudinal drive movement of said card by idler roll pressure engagement of said card against the peripheral drive surface of said feed roll, means for rotationally driving said feed roll in successive angular steps corresponding to the index-point column spacing of said card, means for reading combinational code apertures in successive index-point columns of said card, and manually actuable means for moving said pivotal means to move said idler roll between card-disengaged and card-engaged positions and for concurrently projecting and withdrawing laterally spaced leading-edge card-stop members to enable manual prepositioning of a card on said platform with the first index-point column of said card accurately positioned in readiness for reading by said reading means.

4. A tabulating card reader comprising a fixedly positioned card-supporting platform, at least one rotatably supported feed roll having a peripheral drive surface projecting through an opening in said platform and into driving engagement with the lower surface of a tabulating card supported on said platform, pivotal means for rotatably supporting at least one idler roll in opposing relation to said feed roll and transversely movable into and out of biased engagement with the upper surface of said tabulating card for longitudinal drive movement of said card by idler roll pressure engagement of said card against the peripheral drive surface of said feed roll, means for rotationally driving said feed roll in successive angular steps corresponding to the index-point column spacing of said card, means for reading combinational code apertures in successive index-point columns of said card, manually actuable means for moving said pivotal means to move said idler roll between card-disengaged and card-engaged positions and for concurrently projecting and withdrawing at least one leading edge card-stop member to enable manual prepositioning of a card on said platform with the first index-point column of said card accurately positioned in readiness for reading by said reading means, and spring means fixedly positioned to engage each said stop member in the projected position thereof to restrain insertion of a card into a position in said reader with its leading edge projecting beyond said stop member.

5. A tabulating card reader comprising a fixedly positioned card-supporting platform, at least one rotatably supported feed roll having a peripheral drive surface projecting through an opening in said platform and into driving engagement with the lower surface of a tabulating card supported on said platform, pivotal means for rotatably supporting at least one idler roll in opposing relation to said feed roll and transversely movable into and out of biased engagement with the upper surface of said tabulating card for longitudinal drive movement of said card by idler roll pressure engagement of said card against the peripheral drive surface of said feed roll, means for rotationally driving said feed roll in successive angular steps corresponding to the index-point column spacing of said card, means for reading combinational code apertures in successive index-point columns of said card, manually actuable means for moving said pivotal means to move said idler roll between card-disengaged and card-engaged positions and for concurrently projecting and withdrawing a pair of laterally spaced leading-edge card-stop members to enable manual prepositioning of a card on said platform with the first index-point column of said card accurately positioned in readiness for reading by said reading means, and a pair of fixedly positioned leaf spring members engaged by the projected ends of said stop members to restrain insertion of a card into such position in said reader that its leading edge projects beyond said stop members.

6. A tabulating card reader comprising a fixedly positioned card-supporting platform, at least one rotatably supported feed roll having a peripheral drive surface projecting through an opening in said platform and into driving engagement with the lower surface of a tabulating card supported on said platform, a pivoted member for rotatably supporting at least one idler roll in opposing relation to said feed roll and transversely movable into and out of biased engagement with the upper surface of said tabulating card for longitudinal drive movement of said card by idler roll pressure engagement of said card against the peripheral drive surface of said feed roll, means for rotationally driving said feed roll in successive angular steps corresponding to the index-point column spacing of said card, means for reading combinational code apertures in successive index-point columns of said card, at least one card-stop member carried by said pivoted member and movable therewith to a first position projecting into the path of movement of a card in said reader when said rolls are spaced and to a second position out of said path of card movement when said rolls are both in card-engaging relation, and means for manually moving said pivoted member to move said idler roll between card-disengaged and card-engaged positions thereof.

7. A tabulating card reader comprising a fixedly positioned card-supporting platform, rotatably supported feed rolls having peripheral drive surfaces projecting through openings in said platform and into driving engagement with the lower surface of a tabulating card supported on said platform, pivotal means for rotatably supporting idler rolls in opposing relation to said feed rolls and transversely movable into and out of biased engagement with the upper surface of said tabulating card for longitudinal drive movement of said card by idler roll pressure engagement of said card against the peripheral drive surface of said feed rolls, means for rotationally driving said feed rolls in successive angular steps corresponding to the index-point column spacing of said card, means for reading combinational code apertures in successive index-point columns of said card, manually actuable means for moving said pivotal means to move said idler rolls between card-disengaged and card-engaged positions and for concurrently projecting and withdrawing at least one leading-edge card-stop member to enable manual prepositioning of a card on said platform with the first index-point column of said card accurately positioned in readiness for reading by said reading means, and electrical switch means controlled by said manually actuable means and having switch contacts moved between open-contact and closed-contact positions with movement of said idler rolls, between said spaced and card-engaging positions thereof and thereby enable limitation of operation of said drive means to the card-engaging position of said idler rolls.

8. A tabulating card reader comprising a fixedly positioned card-supporting platform, rotatably supported feed rolls having peripheral drive surfaces projecting through openings in said platform and into driving engagement with the lower surface of a tabulating card supported on said platform, pivotal means for rotatably supporting idler rolls in opposing relation to said feed rolls and transversely movable into and out of biased engagement with the upper surface of said tabulating card for longitudinal drive movement of said card by idler roll pressure engagement of said card against the peripheral drive surface of said feed rolls, means for rotationally driving said feed rolls in successive angular steps corresponding to the index-point column spacing of said card, means for reading combinational code apertures in successive index-point columns of said card, manually actuable means for moving said pivotal means to move said idler rolls between card-disengaged and card-engaged positions and for concurrently projecting and withdrawing at least one leading-edge card-stop member to enable manual prepositioning of a card on said platform with the first index-point column of said card accurately positioned in readiness for reading by said reading means, and electrical switch means having electrical contacts normally in open-circuit position but actuated to closed-circuit position by the presence of a card in reading position in said reader and until the last index-point column of said card has been read by said reading means and thereby enable limitation of operation of said drive means to the card-engaging position of said idler rolls.

9. A tabulating card reader comprising, a fixedly positioned card-supporting platform, opposed feed and idler rolls between which a tabulating card may be inserted and longitudinally moved by idler roll pressure engagement of said card with said feed rolls, means supporting said feed rolls for card-engaging rotational drive about an axis parallel to the card-supporting surface of said platform and for driving said feed rolls in successive angular steps corresponding to the index-point column spacing of said card, means for reading combinational code apertures in successive index-point columns of said card, a pivoted member for movably supporting said idler rolls between spaced and card-engaging positions with respect to said feed rolls, at least one card stop member carried by said pivoted member and movable therewith to a first position projecting into the path of movement of a card in said reader when said rolls are spaced and to a second position out of said path of card movement when said rolls are in card engaging relation, said stop members engaging the leading-edge of a card inserted in said reader to preposition said card with the first index-point column thereof in readiness for reading by said reading means, means for biasing said pivoted member toward card engaging positioning of said idler rolls, and manually actuable cam means for moving said pivoted member by cam actuation thereof and against the bias of said spring bias means to move said idler rolls between said spaced and card-engaging positions thereof.

10. A tabulating card reader comprising, a fixedly positioned card-supporting platform, opposed feed and idler rolls between which a tabulating card may be inserted and longitudinally moved by idler roll pressure engagement of said card with said feed rolls, means supporting said feed rolls for card-engaging rotational drive about an axis parallel to the card-supporting surface of said platform and for driving said feed rolls in successive angular steps corresponding to the index-point column spacing of said card, means for reading combinational code apertures in successive index-point columns of said card, a pivoted frame member for movably supporting said idler rolls between spaced and card-engaging positions with respect to said feed rolls, at least one card stop member carried by said frame member and movable therewith to a first position projecting into the path of movement of a card in said reader when said rolls are spaced and to a second position out of said path of card movement when said rolls are in card engaging relation, said stop members engaging the leading-edge of a card inserted in said reader to preposition said card with the first index-point column thereof in readiness for reading by said reading means, spring means for biasing said frame member toward card engaging positioning of said idler rolls, and a manually actuated cam member rotatable about an axis and having at least one roller which in one position of said cam member engages and moves said frame member to space said idler rolls and which in another position of said cam member is disengaged from said frame member to permit said frame member to bias said idler rolls into said card-engaging position thereof.

11. A tabulating card reader comprising, a fixedly positioned card-supporting platform, opposed feed and idler rolls between which a tabulating card may be inserted and longitudinally moved by idler roll pressure engagement of said card with said feed rolls, means supporting said feed rolls for card-engaging rotational drive about an axis parallel to the card-supporting surface of said platform and for driving said feed rolls in successive angular steps corresponding to the index-point column spacing of said card, means for reading combinational code apertures in successive index-point columns of said card, a pivoted frame member for movably supporting said idler rolls between spaced and card-engaging positions with respect to said feed rolls, at least one card stop member carried by said frame member and movable therewith to a first position projecting into the path of movement of a card in said reader when said rolls are spaced and to a second position out of said path of card movement when said rolls are in card engaging relation, said stop members engaging the leading-edge of a card inserted in said reader to preposition said card with the first index-point column thereof in readiness for reading by said reading means, a spring for biasing said frame member toward card engaging positioning of said idler rolls, and a pivoted shaft having a manually actuable lever and a cam member affixed thereto, said cam member having rollers which in one position of said lever engage and move said frame member to space said idler rolls and which in a second position of said lever are disengaged from said frame member to permit said frame member to bias said idler rolls into said card-engaging position thereof.

12. A tabulating card reader comprising, a fixedly positioned card-supporting platform, opposed feed and idler rolls between which a tabulating card may be inserted and longitudinally moved by idler roll pressure engagement of said card with said feed rolls, means supporting said feed rolls for card-engaging rotational drive about an axis parallel to the card-supporting surface of said platform and for driving said feed rolls in successive angular steps corresponding to the index-point column spacing of said card, means for reading combinational code apertures in successive index-point columns of said card, a pivoted frame member for movably supporting said idler rolls between spaced and card-engaging positions with respect to said feed rolls, at least one card stop member carried by said frame member and movable therewith to a first position projecting into the path of movement of a card in said reader when said rolls are spaced and to a second position out of said path of card movement when said rolls are in card engaging relation, said stop members engaging the leading-edge of a card inserted in said reader to preposition said card with the first index-point column thereof in readiness for reading by said reading means, a spring for biasing said frame member toward card engaging positioning of said idler rolls, a pivoted shaft having a manually actuable lever affixed thereto, and cam means supported on said shaft and movable therewith upon manual actuation of said lever for moving said frame member to move said idler rolls between said spaced and card-engaging positions thereof and for concurrently biasing said lever into and limiting its movement at two corresponding limiting positions to which it may be manually moved.

13. A tabulating card reader comprising, a plurality of electrical contact assemblies actuable in response to the presence of individual ones of code bit apertures appearing in successive code-bit aperture groups each representing an individual item of information recorded in a tabulating card by use of a multibit code form and employing said code bit apertures singly and in code combinations, mechanically actuable means for moving said tabulating card by index-point columns thereof and for sensing the presence of said code bit apertures in said successive code-bit aperture groups to actuate said contact assemblies in response thereto, means responsive to actuation of preselected ones of said assemblies for energizing code-bit output circuits individual thereto and responsive to actuation of the remaining others of said assemblies for energizing said output circuits in preselected combinations of which each said combination is individual to one of said other assemblies and is different from any other combination, and electrical circuits interconnecting contacts of said assemblies to energize a further code-bit output circuit whenever the number of said first-mentioned energized output circuits including none thereof deviates from a preselected type of parity.

14. A tabulating card reader comprising, a plurality of electrical contact assemblies actuable in response to the presence of individual ones of code bit apertures appearing in successive code-bit aperture groups each representing an individual item of information recorded in a tabulating card by use of a multibit code form and employing said code bit apertures singly and in code combinations, mechanically actuable means for moving said tabulating card by index-point columns thereof and for sensing the presence of said code bit apertures in said successive code-bit aperture groups to actuate said contact assemblies in response thereto, means responsive to actuation of preselected ones of said assemblies for energizing code-bit output circuits individual thereto and responsive to actuation of the remaining others of said assemblies for energizing said output circuits in pairs thereof of which each said energized pair is individual to one of said other assemblies and is different from any other energized pair, and electrical circuits interconnecting normally open and normally closed contacts of said assemblies to energize a further code-bit output circuit whenever the number of said first-mentioned energized output circuits including none thereof deviates from a preselected type of parity.

15. A tabulating card reader comprising, a plurality of electrical contact assemblies actuable in response to the presence of individual ones of code bit apertures appearing in successive code-bit aperture groups each representing an individual item of information recorded in a tabulating card by use of a multibit code form and employing said code bit apertures singly and in code combinations, mechanically actuable means for moving said tabulating card by index-point columns thereof and for sensing the presence of said code bit apertures in said successive code-bit aperture groups to actuate said contact assemblies in response thereto, means responsive to actuation of preselected ones of said assemblies for energizing code-bit output circuits individual thereto and responsive to actuation of the remaining others of said assemblies for energizing said output circuits in preselected combinations of which each said combination is individual to one of said other assemblies and is different from any other combination, and electrical circuits interconnecting normally open and normally closed contacts of said assemblies to energize a further code-bit output circuit whenever an even number of said first-mentioned output circuits are energized.

16. A tabulating card reader comprising, a plurality of electrical contact assemblies actuable in response to the presence of individual ones of code bit apertures appearing in successive code-bit aperture groups each representing an individual item of information recorded in a tabulating card by use of a multibit code form and employing said code bit apertures singly and in code combinations, mechanically actuable means for moving said tabulating card by index-point columns thereof and for sensing the presence of said code bit apertures in said successive code-bit aperture groups to actuate said contact assemblies in response thereto, means responsive to actuation of preselected ones of said assemblies for energizing code-bit output circuits individual thereto and responsive to actuation of the remaining others of said assemblies for energizing said output circuits in preselected combinations of which each said combination is individual to one of said other assemblies and is different from any other combination, and electrical circuits interconnecting normally open and normally closed contacts of said assemblies to energize a further code-bit output circuit whenever the energization of any pair of said first-mentioned output circuits is not accompanied by concurrent actuation of one of said preselected assemblies to effect energization of a further one of said output circuits individual thereto.

17. A tabulating card reader comprising, a plurality of electrical contact assemblies actuable in response to the presence of individual ones of code bit apertures appearing in successive code-bit aperture groups each representing an individual item of information recorded in a tabulating card by use of a multibit code form and employing said code bit apertures singly and in code combinations, mechanically actuable means for moving said tabulating card by index-point columns thereof and for sensing the presence of said code bit apertures in said successive code-bit aperture groups to actuate said contact assemblies in response thereto, means responsive to actuation of preselected ones of said assemblies for energizing code-bit output circuits individual thereto and responsive to actuation of the remaining others of said assemblies for energizing said output circuits in preselected combinations of which each said combination is individual to one of said other assemblies and is different from any other combination, and electrical circuits interconnecting normally open and normally closed contacts of said assemblies for energizing a further code-bit output circuit whenever any combination of said preselected assemblies is concurrently actuated to energize a number of said output circuits including none thereof deviating from a preselected type of parity.

18. A tabulating card reader comprising, a plurality of electrical contact assemblies actuable in response to the presence of individual ones of code bit aperture appearing in successive code-bit aperture groups each representing an individual item of information recorded in a tabulating card by use of a multibit code form and employing said code bit apertures singly and in code combinations, mechanically actuable means for moving said tabulating card by index-point columns thereof and for sensing the presence of said code bit apertures in said successive code-bit aperture groups to actuate said contact assemblies in response thereto, means responsive to actuation of preselected ones of said assemblies for energizing code-bit output circuits individual thereto and responsive to actuation of the remaining others of said assemblies for energizing said output circuits in preselected combinations of which each said combination is individual to one of said other assemblies and is different from any other combination, and electrical circuits interconnecting normally open and normally closed contacts of said assemblies for energizing a further code-bit output circuit whenever any pair of said preselected assemblies is concurrently actuated.

19. A tabulating card reader comprising, a plurality of electrical contact assemblies actuable in response to the presence of individual ones of code bit apertures appearing in successive aperture groups each representing an individual item of information recorded in a tabulating card by use of a multibit code form and employing said code bit apertures singly and in code combinations, mechanically actuable means for moving said tabulating card by index-point columns thereof and for sensing the presence of said code bit apertures in said successive code-bit aperture groups to actuate said contact assemblies in response thereto, means responsive to actuation of preselected ones of said assemblies for energizing code-bit output circuits individual thereto and responsive to actuation of the remaining others of said assemblies for energizing said output circuits in pairs thereof of which each said energized pair is individual to one of said other assemblies and is different from any other energized pair, and electrical circuits interconnecting normally open and normally closed contacts of said assemblies for energizing a further code-bit output circuit whenever any pair of said preselected assemblies and one of said other assemblies are concurrently actuated.

20. A tabulating card reader comprising, a plurality of electrical contact assemblies actuable in response to the presence of individual ones of code bit apertures appearing in successive code-bit aperture groups each representing an individual item of information recorded in a tabulating card by use of a multibit code form and employing said code bit apertures singly and in code combinations, mechanically actuable means for moving said tabulating card by index-point columns thereof and for sensing the presence of said code bit apertures in said successive code-bit aperture groups to actuate said contact assemblies in response thereto, means responsive to actuation of preselected ones of said assemblies for energizing an odd number of code-bit output circuits singly and in combination distinctively to identify individual ones of said preselected assemblies and responsive to actuation of the remaining others of said assemblies for energizing said output circuits in combinational pairs thereof of which each said energized pair is individual to one of said other assemblies and is different from any other energized pair, and electrical circuits interconnecting contacts of said assemblies to energize a further code-bit output circuit whenever the number of said first-mentioned energized output circuits including none thereof deviates from odd parity.

21. A tabulating card reader comprising, a plurality of electrical contact assemblies actuable in response to the presence of individual ones of code bit apertures appearing in successive code-bit aperture groups each representing an individual item of information recorded in a tabulating card by use of a multibit code form and employing said code bit apertures singly and in code combinations, mechanically actuable means for moving said tabulating card by index-point columns thereof and for sensing the presence of said code bit apertures in said successive code-bit aperture groups to actuate said contact assemblies in response thereto, means responsive to actuation of preselected ones of said assemblies for energizing an odd number of code-bit output circuits singly and in combination distinctively to identify individual ones of said preselected assemblies and responsive to actuation of the remaining others of said assemblies for energizing said output circuits in combinational pairs thereof of which each said energized pair is individual to one of said other assemblies and is different from any other energized pair, and electrical circuits interconnecting normally open and normally closed contacts of said assemblies for energizing a further code-bit output circuit whenever any pair of said preselected assemblies and one of said other assemblies are concurrently actuated.

References Cited by the Examiner

UNITED STATES PATENTS

| 2,323,833 | 7/1943 | Mixer | 235—61.11 X |
|---|---|---|---|
| 2,693,593 | 11/1954 | Crosman | 340—347 |
| 2,729,811 | 1/1956 | Gloess | 340—347 |
| 2,798,668 | 7/1957 | Watkin | 235—61.11 |
| 2,833,474 | 5/1958 | Wilson et al. | 235—61.11 |
| 2,889,984 | 6/1959 | Gruver | 235—61.11 X |
| 2,905,298 | 9/1959 | Blodgett et al. | 235—61.11 X |
| 2,938,667 | 5/1960 | Deutsch | 235—61.11 X |
| 2,994,475 | 8/1961 | Beattie | 235—61.11 |
| 3,011,165 | 11/1961 | Angel et al. | 340—347 |

MALCOLM A. MORRISON, *Primary Examiner.*

ABRAHAM BERLIN, WALTER W. BURNS, JR.,
*Examiners.*

UNITED STATES PATENT OFFICE
CERTIFICATE OF CORRECTION

Patent No. 3,227,860 January 4, 1966

Edwin O. Blodgett

It is hereby certified that error appears in the above numbered patent requiring correction and that the said Letters Patent should read as corrected below.

Column 1, line 53, for "obect" read -- object --; column 7, line 35, for "cole" read -- code --; line 55, for "10" read -- 0 --; column 14, line 73, after "successive" insert -- code bit --.

Signed and sealed this 6th day of December 1966.

(SEAL)
Attest:

ERNEST W. SWIDER
Attesting Officer

EDWARD J. BRENNER
Commissioner of Patents